US011244047B2

(12) United States Patent
Muttik et al.

(10) Patent No.: US 11,244,047 B2
(45) Date of Patent: *Feb. 8, 2022

(54) INTELLIGENT BACKUP AND VERSIONING

(71) Applicant: McAfee, LLC, Santa Clara, CA (US)

(72) Inventors: Igor Muttik, Berkhamsted (GB); Simon Hunt, Naples, FL (US); Cedric Cochin, Portland, OR (US); Craig Schmugar, Beaverton, OR (US); Robert Leong, Beaverton, OR (US); Christiaan Beek, West-Linn, OR (US); Yury Bulygin, Beaverton, OR (US)

(73) Assignee: McAfee, LLC, San Jose, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/579,761

(22) Filed: Sep. 23, 2019

(65) Prior Publication Data
US 2020/0034532 A1 Jan. 30, 2020

Related U.S. Application Data

(63) Continuation of application No. 15/382,787, filed on Dec. 19, 2016, now Pat. No. 10,423,782.

(51) Int. Cl.
*G06F 17/00* (2019.01)
*G06F 21/55* (2013.01)
(Continued)

(52) U.S. Cl.
CPC ........ *G06F 21/554* (2013.01); *G06F 11/1076* (2013.01); *G06F 11/1448* (2013.01);
(Continued)

(58) Field of Classification Search
CPC ............... G06F 21/554; G06F 11/1448; G06F 11/1464; G06F 11/1458; G06F 2201/875; G06F 2221/034; G06F 11/1076
See application file for complete search history.

(56) References Cited

U.S. PATENT DOCUMENTS 7,962,956 B1 6/2011 Liao et al.
9,990,511 B1 * 6/2018 Dreyfus .................. G06F 21/57
(Continued)

FOREIGN PATENT DOCUMENTS

WO 2018020362 A1 2/2018

OTHER PUBLICATIONS

Kunz, Thomas, et al.: "On the measurement of Data Protection Compliance of Cloud Services", Plödereder, E.; Grunske, L.; Schneider, E.; Ull, D.; Gesellschaft für Informatik—GI-, Bonn: Informatik 2014. Big Data—Komplexität meistern. CD-ROM : Tagung der Gesellschaft für Informatik, 22.—Sep. 26, 2014 in Stuttgart, Deutschland Bonn: Köllen, 2014 (GI—Edition—Lecture Notes in Informatics (LNI)—Proceedings 232); ISBN: 978-3-88579-626-8; pp. 289-296.
(Continued)

*Primary Examiner* — Hung D Le
(74) *Attorney, Agent, or Firm* — Patent Capital Group (57) ABSTRACT

There is disclosed in one example a computing apparatus, including: a processor and a memory; a network interface to communicatively couple to a backup client; a storage to receive backup data from the client, including a plurality of versions and an associated reputation for each version, the associated reputation to indicate a probability that the version is valid; and instructions encoded within the memory to instruct the processor to: receive from the backup client a request to store a new version of the backup data; determine that the client has exceeded a backup threshold; identify a backup version having a lowest reputation for validity; and expunge the backup version having the lowest reputation for validity.

20 Claims, 6 Drawing Sheets

(51) Int. Cl.
*G06F 11/14* (2006.01)
*G06F 11/10* (2006.01)
*G06F 21/57* (2013.01)
*G06F 21/64* (2013.01)
*H04L 29/06* (2006.01)

(52) U.S. Cl.
CPC ...... *G06F 11/1458* (2013.01); *G06F 11/1464* (2013.01); *G06F 11/1469* (2013.01); *G06F 21/57* (2013.01); *G06F 21/577* (2013.01); *G06F 21/64* (2013.01); *H04L 63/1433* (2013.01); *G06F 2201/875* (2013.01); *G06F 2221/034* (2013.01)

(56) References Cited

U.S. PATENT DOCUMENTS

| | | | |
|---|---|---|---|
| 2003/0220948 A1 | 11/2003 | Green et al. | |
| 2008/0047013 A1 | 2/2008 | Claudatos et al. | |
| 2009/0204700 A1* | 8/2009 | Satya Sudhakar | H04L 67/104 709/224 |
| 2014/0095625 A1* | 4/2014 | Quan | A63F 13/50 709/205 |
| 2015/0012494 A1* | 1/2015 | Jewell | G06F 11/1464 707/638 |
| 2016/0019317 A1* | 1/2016 | Pawar | G06F 16/907 707/649 |
| 2016/0104536 A1* | 4/2016 | Zhou | G06F 3/0652 365/185.29 |
| 2016/0142485 A1* | 5/2016 | Mitkar | G06F 16/128 707/681 |
| 2017/0177867 A1* | 6/2017 | Crofton | G06F 21/565 |
| 2018/0024893 A1* | 1/2018 | Sella | G06N 7/005 707/648 |
| 2018/0107563 A1* | 4/2018 | Bender | G06F 16/148 |
| 2018/0139053 A1* | 5/2018 | Kadam | G06F 11/1451 |

OTHER PUBLICATIONS

Nelson, Tom: 11 "Use Time Machine's Command Line Utility to Measure the Changes in Each Backup 11", Apr. 13, 2014, macs.about.com, 2 pages; XP055463013.

* cited by examiner

INTELLIGENT BACKUP AND VERSIONING

CROSS-REFERENCE TO RELATED APPLICATION

This application is a continuation of U.S. patent application Ser. No. 15/382,787, filed on Dec. 19, 2016 and entitled "INTELLIGENT BACKUP AND VERSIONING," Inventors Igor Muttik, et al. The disclosure of the prior application is hereby incorporated by reference in its entirety in the disclosure of this application.

FIELD OF THE SPECIFICATION

This disclosure relates in general to the field of computer security, and more particularly, though not exclusively, to a system and method for intelligent backup and versioning.

BACKGROUND

Ransomware is a denial of access attack on a computer system. In a typical ransomware attack, a malicious Trojan is installed on the target machine. The Trojan then locks down the computer, and demands a ransom for unlocking it. An unsophisticated ransomware may use an easily-circumvented attack, such as locking the user's account. But more advanced ransomware may actually encrypt the user's files, and demand a ransom in exchange for the decryption key. As it may be impractical to decrypt the files without the key, and as the user's files may be important, many users pay the ransom.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

In an example, there is disclosed a computing apparatus, comprising: a processor and a memory; a network interface to communicatively couple to a backup client; a storage to receive backup data from the client, including a plurality of versions and an associated reputation for each version, the associated reputation to indicate a probability that the version is valid; and instructions encoded within the memory to instruct the processor to: receive from the backup client a request to store a new version of the backup data; determine that the client has exceeded a backup threshold; identify a backup version having a lowest reputation for validity; and expunge the backup version having the lowest reputation for validity.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Ransomware is a growing problem that can negatively impact both individual users and enterprises, and that can target a wide array of devices—from smartphones, tablets, and Ultrabooks®, to cloud server farms and high-performance computing (HPC).

An initial approach to combatting ransomware may include recognizing unwanted file changes via rules and heuristic methods. This behavioral approach to ransomware is effective in some contexts, but may be limited by the malware author's ability to learn the rules and create workarounds to them. In certain embodiments, in addition to or instead of such behavioral approaches, protected backups and/or filesystems may be maintained, including an inventory or index of modifications made to each file or object. This may be referred to as "backup versioning," and each modification may be assigned a version label. Throughout this specification, the file, folder, object, disk, or store being backed up may be referred to as the "source." The source should be broadly understood to include any data object that can be backed up using the methods disclosed herein or equivalent methods. Depending on context, when restoring, the "source" may be anything from an individual file that was lost to an entire filesystem of a crashed disk.

In each of the following examples and throughout this specification, the source may be stored as a "destination object" in a "backup destination." The destination object may include, by way of non-limiting example, a backup file or folder. The destination object may be stored on the same disk (e.g., a ".tar," ".tgz," ".zip," ".iso," ".img," backup folder, or backup file or folder), an external target such as an optical medium (CD/DVD/Blu-Ray), an external hard drive, a peer machine, a tape drive, a dedicated backup server or appliance, a storage array such as redundant array of independent disks (RAID) or redundant array of independent nodes (RAIN), network attached storage (NAS), or a third-party or "cloud" service that may use any or all of the foregoing. Different backup approaches have different advantages and disadvantages. For example:

a. Full Backups—Most backup schemes start with a "full backup," in which all of the data in the source are copied en masse to a destination object. This may be a single archival file or mirrored folder, or it may be distributed in a RAID or RAIN fashion. In some cases, particularly in the case of novice or home users, the backup may simply be copied (such as by a "cron" job overnight, or even manually when the user thinks about it) to the backup destination, and each incremental backup comprises a full backup of this type. The user may overwrite the backup each time, or may keep a set number of backup copies (e.g., only keep the three most recent backups). This type of backup scheme is easy to setup and administer, and can be very easy to recover from provided the desired backup is available and not compromised (e.g., as long as the backup drive has not failed and the backup is valid, just unzip the backup file into the user's home directory). But this type of backup can also consume huge amounts of storage, as the user may have changed only a small percentage of files between each backup. Thus, each individual copy of "backup.tgz" may include copies of thousands upon thousands identical files, thus consuming much space with little incremental benefit.

b. Distributed Backups—In more sophisticated systems, rather than having a single stored copy of the source on the backup destination, a large full backup may be maintained in a distributed fashion on a RAID or RAIN system or similar. In that case, the destination object may be divided into m slices, such that for n<m, the destination object (and thus the source) can be reconstructed with any n slices. Any type of destination object (e.g., full, differential, incremental) may be stored in a distributed backup.

c. Differential Backups—A differential backup includes a single full backup, and a single cumulative backup of all changes since the last full backup (a "delta"). In other words, the delta tracks all changes since the last full backup. Each incremental backup results in a new delta, and the previous delta may be discarded (or kept as a previous version). This type of backup is more efficient than continuous incremental backups because the delta is often much smaller than the full backup. To maintain several backup versions, several deltas are required, each one representing a "snapshot" of the state of the source at the time of the delta. Advantageously, differential backups provide quick recovery times, as only the full backup and the target delta are required to restore the source. However, as the full backup ages, the delta generally grows larger as more files are changed. Not only does this increase storage demands, but it can also increase restoration time relative an incremental backup.

d. Filesystem Level Incremental Backups—File level incremental backups consider only those files that have been changed since the last backup, and creates a delta from the last incremental backup. Thus, each delta is dependent on the last delta, and to correctly reconstruct the destination object (and thus the source), each delta in the chain is required. This results in somewhat greater complexity than a differential backup, and may be considered more fragile in that a long chain of deltas may be required rather than just one full backup and one delta. However, daily incremental backups are generally relatively small (a user may work on only a small number of files in a given day), meaning that it is often practical to store these with great redundancy. Furthermore, as the full backup object ages and the number of changes increases, restoration from an incremental backup may be faster and more efficient than restoration from a single differential delta, which may have grown quite large. One limitation of file level incremental backups is that when large files are changed frequently, they are backup up many times. For example, consider a user who stores personal information such as bank accounts, social security numbers, and critical business data in a single large, encrypted virtual container. Because the file system (and thus the backup software) may treat that container as a single file, any time a file is changed, the whole container is backed up. The same issue may be encountered with users who author large files, such as video authoring.

e. File Versioning Backups—Utilities such as "Git," "CVS," "Subversion," and many others keep file level incremental backups. In these cases, the delta is kept not at the filesystem level, but at the file level. This type of versioning is often used with text-based files, such as program source or assembly files, or text documents. Although binary deltas are also possible, they are more difficult and computationally-intensive to maintain. The advantage of file versioning is that common portions of a large file need not be stored numerous times (as in the filesystem level backup). Rather, the delta includes changes to the file itself. Note that differential (versus incremental) file versioning is also possible, though it is less common.

As suitable to a particular embodiment, one of the foregoing methods (or any other suitable method) may be used to create a protected backup with versioning (where "versioning" may be incremental, differential, filesystem level, file level, etc.). This may allow restoration of data even if ransomware compromises the system and applies encryption or deletes original objects. The source may be restored to the last version before the encryption or deletion occurred.

In a perfect theoretical framework, an unlimited number of backup versions can be retained. If a source is compromised by ransomware, or by any other data loss event (such as, by way of non-limiting example, a hard drive failure, accidental deletion, major changes that need to be "rolled back," or accidental overwrite), the backup can be rolled back to the last "good" version without the flaw. However, in practice, computing resources are limited, and it may not be practical to retain unlimited backup versions. If versioned backups are stored indiscriminately, certain difficulties arise. For example:

a. The space required may grow quickly.

b. Many cloud backup services bill their service as "unlimited." However, storing unlimited versioned user data (instead a single, unversioned destination object) stresses the infrastructure of the cloud provider, posing scalability and cost concerns.

c. When a ransomware attack does occur, it may be difficult for the user to find the last "good" (uncompromised) version.

d. Indiscriminate versioning provides only limited protection against malware that deliberately performs "data diddling" (making small and infrequent modifications to the data that ultimately result in corruption). This may be for the purpose of making it difficult to detect changes. While data diddling may, in some cases, be less destructive than encrypting, it can also be harder to detect. Making subtle changes to a document (e.g., changing a few words here and there) could cause serious problems depending on the importance of the document, and may be difficult to fix without a complete review of the document.

As a compromise solution, many cloud backup services offer some limited versioning. For example, a service may store rolling incremental backups that go back 30 days. While this provides some protection, there are situations where it fails to mitigate a ransomware attack. For example, the user may have a file that is critical when he needs to access it, but that he does not access frequently, such as a tax return. The user may not access tax return files on a regular basis, but if he is audited, it may be critical for him to gain access to them. If the user is unaware of the ransomware attack, a corrupted or encrypted version of his tax data may be stored on the hard drive, and backed up to his cloud service. When the user goes to access the data, he may find that it has been compromised, and he is far past the 30-day window in which to access a last good (uncompromised) copy of the data.

Storage of versioned backups can be improved by introducing a size-based (rather than time-based) quota with discriminate version selection. When a user reaches the storage quota, rather than purging based on a rolling time window, the storage server purges the least reputable (i.e., least likely to be valuable) version of the backup, thus freeing up space and staying under quota. On the other hand, if data are compromised, the reputation can be used to select the version most likely to contain a useful backup (i.e., before the ransomware attack, or other data loss event).

The reputation may be determined in context, as well as from a delta between the current destination object and a new incoming destination object. In one embodiment, a relatively high delta may indicate a potential threat, and may result in a backup version with a relatively lower reputation, while a relatively low delta may indicate a likely-good backup with a relatively higher reputation (i.e., the magnitude of the delta is inversely proportional to the reputation).

Note that in this embodiment, a larger scalar number represents a "better" reputation, but this is a non-limiting example. In other embodiments, a smaller number could represent a better reputation. In yet other embodiments, the reputation could be a multi-faceted vector or matrix, with numerous fields that could encode various factors, such as contextual data. In that case, the absolute magnitude of the reputation may not be the only thing considered. Rather, depending on the context, different fields in the reputation could have greater or lesser sway.

In one embodiment, an intelligent backup engine assigns a reputation comprises:
  a. A local backup agent requests a new backup. (Note that alternately, a cloud-based backup server could "pull" the backup from the local device).
  b. The intelligent backup engine determines whether new data are being created (i.e., this is a new destination object), or whether existing data are being updates (resulting in a delta).
  c. For updates, the intelligent backup engine retrieves the context and/or reputation for the previous version.
  d. The storage engine checks the quota, which may be assigned to the user, the user's machine, the disk, or this destination object specifically, by way of non-limiting example.
  e. If the quota has been reached, the intelligent backup engine removes the backup with the lowest reputation, thus preserving the quota requirement without removing high reputation backups.
  f. In some embodiments, rather than completely removing lower reputation versions, the intelligent backup engine may move that version to a less expensive backup medium. For example, if the backup is local, the low-reputation backup may be moved to an off-site cloud storage. Or the low-reputation version may be moved from an active backup server (RAID, RAIN, NAS, etc.) to an archival storage (e.g., a tape archive) that is less easily accessible. This may be referred to as "demoting" that backup version (versus "removing" or "deleting" the backup).
  g. In some embodiments, the intelligent backup engine may also log which backup version or versions were demoted or removed, and as appropriate, may log data on accessing the demoted version. For example, the log may include a uniform resource locator (URL) for accessing an off-site or cloud backup, or may include a serial number and date for locating a specific tape where the version was stored.
  h. The intelligent backup engine stores a new version (e.g., delta information), along with the context. The context may include, for example, a structure comprising, by way of non-limiting example, {version, link to the previous version, data source, reputation of the software that initiated the backup, timestamp, writing pattern, entropy, history, comparison with other contexts and/or history, and user presence}.
  i. Certain embodiments may also store the computed reputation.
  j. The intelligent backup engine completes the backup operation.

In certain embodiments, the analysis engine assigns the backup version a reputation based on one or more of the following contextual parameters:
  a. Analysis of the entropy of the new backup data when compared to a reference entropy figure for the file type. For example, "Word" documents may have a reference entropy figure. Substantial deviation from this reference entropy (especially significantly greater entropy) may be a strong indicator that the file has been encrypted.
  b. The timing of the backup may be compared to a pre-shared backup schedule. For example, unscheduled backups during non-office hours may be suspicious.
  c. The backup write pattern may be analyzed. Is it one short burst or a long one? Is it one file or many? Does it match previous write patterns or is it out of the ordinary?
  d. User presence may influence reputation. For example, if the user is present and initiates the backup from trusted backup software, the backup may have a higher reputation than a backup that was initiated automatically (especially off-schedule) by an unknown or untrusted backup software. This could also include looking to see whether a remote session was active, and whether it was secure and/or trusted.
  e. The global reputation of the software that initiated the backup may be considered. For example, MCAFEE, LLC's Global Threat Intelligence (GTI™) database may be queried to retrieve a global signature and reputation. If the application conforms to the signature and has a high reputation, it may be more trusted than an unknown application, or one without a good reputation.
  f. The presence of a trust operation may also be considered. For example, if the backup operation was confirmed out-of-band by the user (e.g., via a code sent to the user via SMS)

g. The (filesystem level) delta between incremental versions may be considered. For example, backups with low deltas may have relatively lower reputations than versions with higher deltas, because only a few files were changed. This may be indicative of malware gradually changing only one or two files at a time ("data diddling"). This factor could also be exacerbated if, for example, one or two infrequently-accessed files are changed at a time, with many such files changing over time. In some embodiments, data diddling may be detected heuristically. For example, data diddling may include modifying portions of a document that users do not frequently edit, such as header data, metadata, or other hidden data. Small changes to such data may be deemed suspicious.

h. The intelligent backup engine may correlate backup activity across multiple users and detect anomalies via rules or machine learning methods (e.g., if many users have out-of-schedule backup with a similar pattern, it may indicate the same ransomware attacked multiple targets).

i. At the file level, the size of the delta between the current file and current backup. Small deltas may be expected for some file types (e.g., plain text configuration files). Other file types may have much larger deltas (for example, although they are "text," Microsoft Word documents are stored internally as binary ".zip" files, which may result in relatively large file level changes). Thus, if a file has a large delta, this may indicate that the current backup needs a high reputation to preserve it.

j. Structured file types may also be a factor in assigning a reputation. For example, either ransomware or a file write error could be responsible for a change in data that is not conformant to the data structure. If a write to a ".zip" file results in a corruption that renders the final form of the file invalid as a .zip file, then it may be advantageous to retain the last good and usable version of the file. This is true whether the write was the result of malicious activity, a filesystem error, or user error.

In certain embodiments, the intelligent backup engine performs "garbage collection" in several ways:

a. When the quota is reached, the engine removes backup entries with the lowest reputation. The intelligent backup engine may proactively avoid quota violation by automatically managing space in the background (e.g., when the cloud provider experiences lower loads) by deleting low-reputation backup or moving backups to other media.

b. Certain embodiments may be configured so that the intelligent backup engine keeps the highest delta versions of different files in all cases. For example in the case of t.txt and t.zip, both copies would be retained (as they have dramatically different content), but incremental old versions of t.txt that differ slightly may be purged more often.

c. In cases of file deletion (rather than overwrite), the last deleted version of a file may naturally be assigned a high reputation (purge less often or never).

A system and method for intelligent backup and versioning will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1:
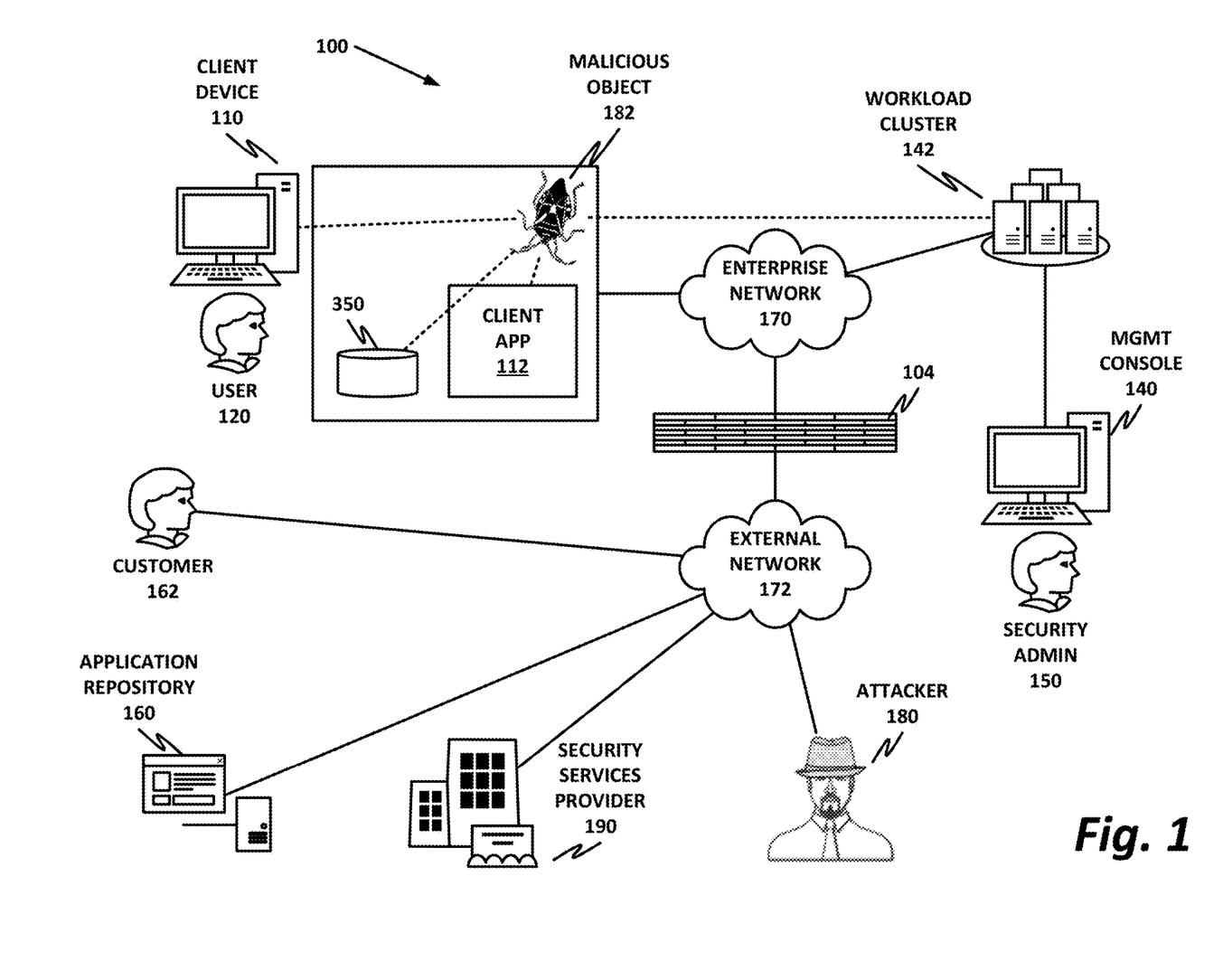
FIG. 1 is a block diagram of a security-enabled network according to one or more examples of the present specification.

FIG. 1 is a network-level diagram of a secured enterprise 100 according to one or more examples of the present specification. In the example of FIG. 1, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise 100, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the internet (optionally accessed via a proxy, virtual machine, or other similar security mechanism) by way of non-limiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 (which may be, for example, malware) into client device 110. Once malicious object 182 gains access to client device 110, it may try to perform work such as "data diddling," encrypting important files, corrupting files, or other malicious activity such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. MCAFEE, LLC is a non-limiting example of such a security services provider that offers comprehensive security and antivirus solutions. In some cases, security services provider 190 may include a threat intelligence capability such as the global threat intelligence (GTI™) database provided by MCAFEE, LLC. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
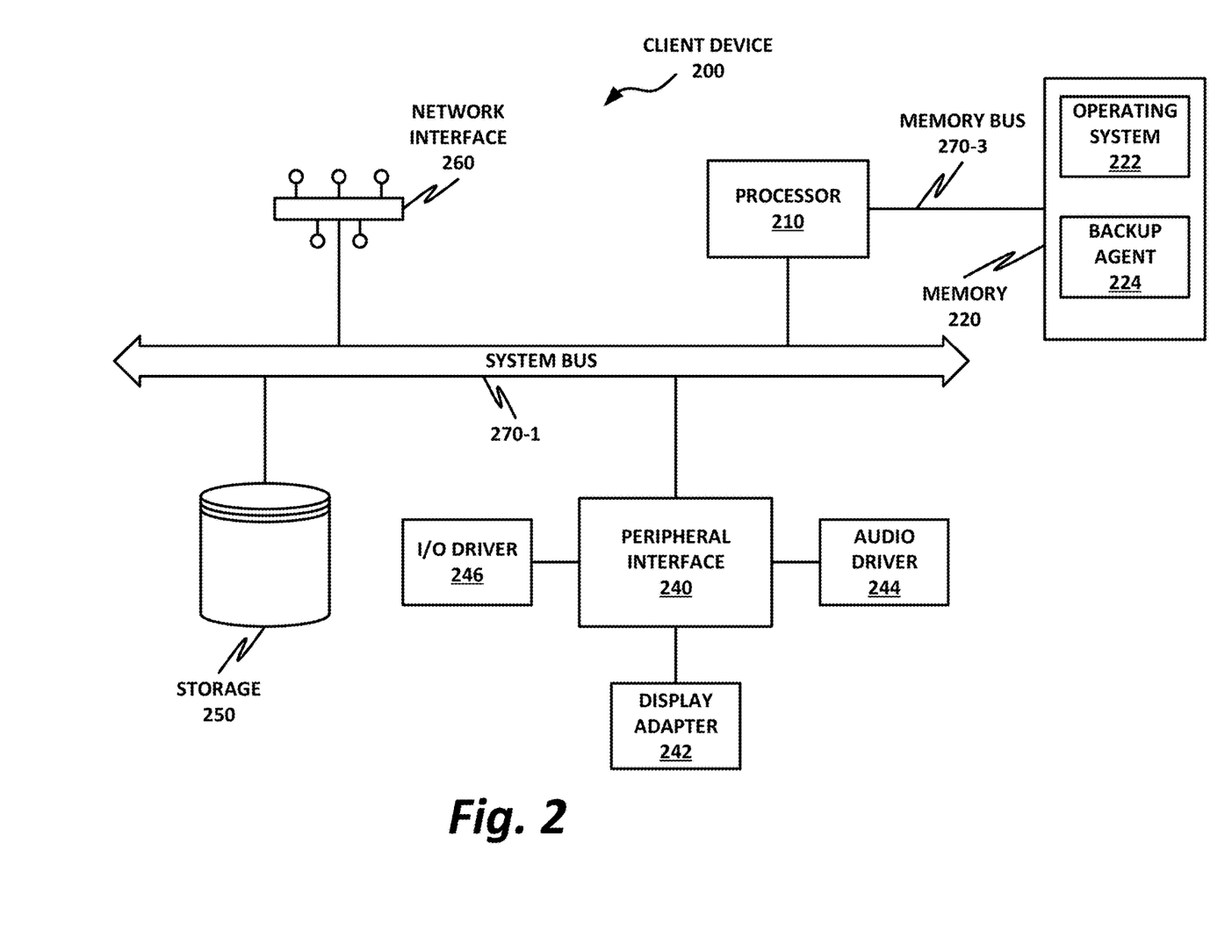
FIG. 2 is a block diagram of a computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of a client device 200.

Client device 200 includes a processor 210 connected to a memory 220, having stored therein executable instructions for providing an operating system 222 and at least software portions of a backup agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of VMs or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field programmable gate array, graphics processing unit, programmable logic array, application specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR random access memory (RAM), SRAM, DRAM, cache, L1 or L2 memory, on-chip memory, registers, flash, read only memory (ROM), optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, RAID, NAS, optical storage, tape drive, backup system, cloud storage, or any combination of the foregoing. Storage 250 may be, or may include therein, a database or databases or data stored in other configurations, and may include a stored copy of operational software such as operating system 222 and software portions of backup agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Backup agent 224, in one example, is operable to carry out computer-implemented methods as described in this specification. Backup agent 224 may include one or more tangible non-transitory computer-readable mediums having stored thereon executable instructions operable to instruct a processor to provide a backup agent 224. As used throughout this specification, an "engine" includes any combination of one or more logic elements, of similar or dissimilar species, operable for and configured to perform one or more methods provided by the engine. Thus, backup agent 224 may comprise one or more logic elements configured to provide methods as disclosed in this specification. In some cases, backup agent 224 may include a special integrated circuit designed to carry out a method or a part thereof, and may also include software instructions operable to instruct a processor to perform the method. In some cases, backup agent 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that backup agent 224 may also include other hardware and software, including configuration files, registry entries, and interactive or user-mode software by way of non-limiting example.

In one example, backup agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of backup agent 224 to provide the desired method.

Figure 3:
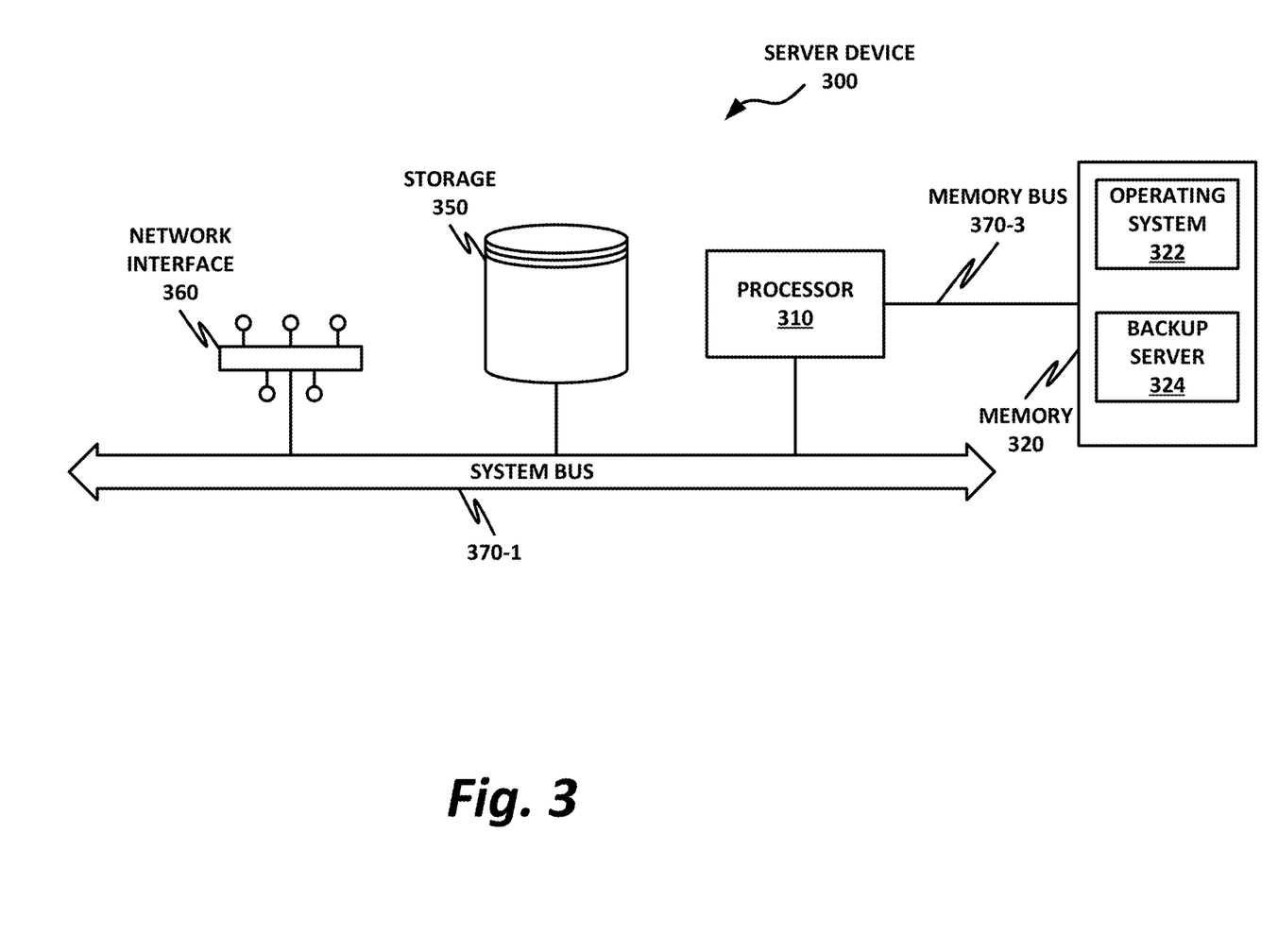
FIG. 3 is a block diagram of a server according to one or more examples of the present specification.

Note that in this embodiment, backup agent 224 is shown as a client-side application running in main memory, while a separate backup server 334 is shown in FIG. 3. This should be understood as a non-limiting example that illustrates only one of many possible configurations. In this particular example, backup agent 224 (client-side) may be a backup solution such as Acronis, Synology, or some other software. Backup agent 224 may also include a client engine for a cloud-based backup service, such as Carbonite, CrashPlan, or similar.

The "intelligent" aspect of backup and versioning may reside, in whole or in part, in backup agent 224, backup server 324, or both. Thus, in a general sense, the intelligent backup engine of this specification could include one or both of these, or some other similar structure.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as digital video interface (DVI) or high definition multimedia interface (HDMI), by way of non-limiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a backup server 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a DMA bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of backup server 324.

Network interface 360 may be provided to communicatively couple server 300 to a wired or wireless network, and may include one or more logic elements as described in FIG. 2.

Backup server 324 is an engine as described in FIG. 2 and, in one example, includes one or more logic elements operable to carry out computer-implemented methods as described in this specification. Software portions of backup server 324 may run as a daemon process.

Backup server 324 may include one or more non-transitory computer-readable mediums having stored thereon executable instructions operable to instruct a processor to provide backup server 324. At an appropriate time, such as upon booting server 300 or upon a command from operating system 322 or a user 120 or security administrator 150, processor 310 may retrieve a copy of backup server 324 (or software portions thereof) from storage 350 and load it into memory 320. Processor 310 may then iteratively execute the instructions of backup server 324 to provide the desired method.

Figure 4:
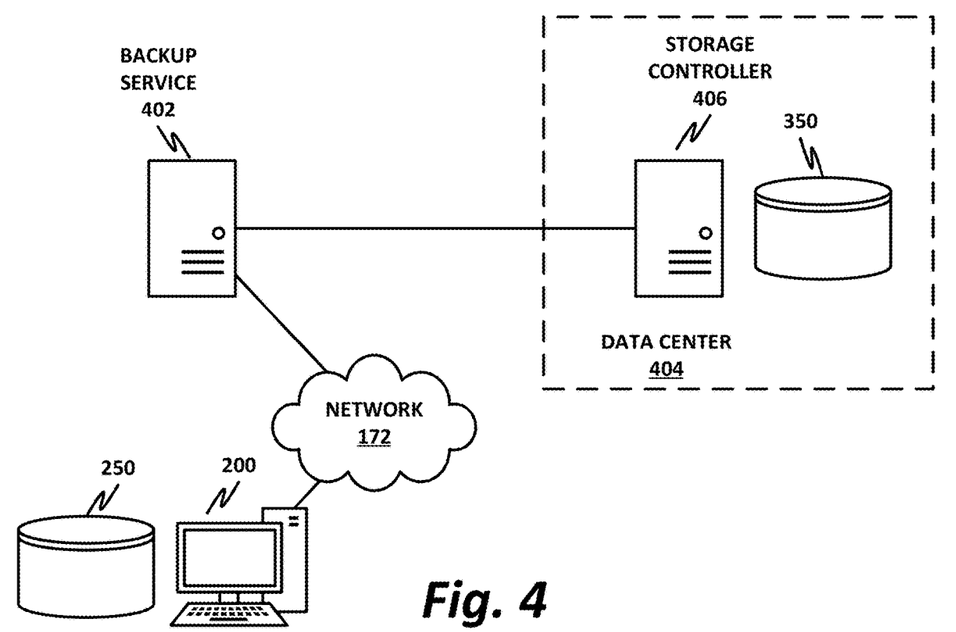
FIG. 4 is a block diagram of a backup architecture according to one or more examples of the present specification.

FIG. 4 is a block diagram illustrating one non-limiting example of a client-server backup model. In the example of FIG. 4, a client device 200 includes an attached storage 250, which may contain source data that may be backed up for data preservation purposes. In this case, an operator of client device 200 contracts with a backup service 400 to provide off-site backup services. For example, a backup agent 224 on client device 200 may backup data from storage 250 to backup service 400 via network 172. The backup may occur on a continuous basis (e.g., any time a file is committed to disk), or it could be a regularly-scheduled backup, such as a nightly backup.

Client device 200 sends backup data to backup service 402, which provides the backup data to a data center 404. In this example, data center 404 includes a storage controller 406, having attached thereto a storage 350. Storage controller 406 may be a node in a RAIN array, or it may have several disks attached to it in a RAID configuration. Many other configurations are possible, and are intended to be included within the scope of this specification.

When client device 200 provides backup data to backup service 400 via network 172, storage controller 406 may operate backup server 324 to analyze the data and assign the backup a reputation according to the methods disclosed herein. If a quota has been reached, then based on the reputation that is assigned to the backup version, as well as the reputations that are assigned to previous backup versions, one or more backup versions may be demoted, such as being erased or moved to a less expensive storage solution.

Note that this model is only one of many possible models that are compatible with the methods disclosed herein. In other embodiments, client device 200 could have attached thereto a separate storage that is provided for backup purposes. In that case, the intelligent backup engine may be embodied within backup agent 224, and backup service 402 may not be involved. In yet other embodiments, a hybrid solution may be used, in which client device 200 keeps local backups, and also sends off-site backups to backup service 402. In that case, the intelligent backup engine may be embodied both within storage controller 406 and client device 200.

Figure 5:
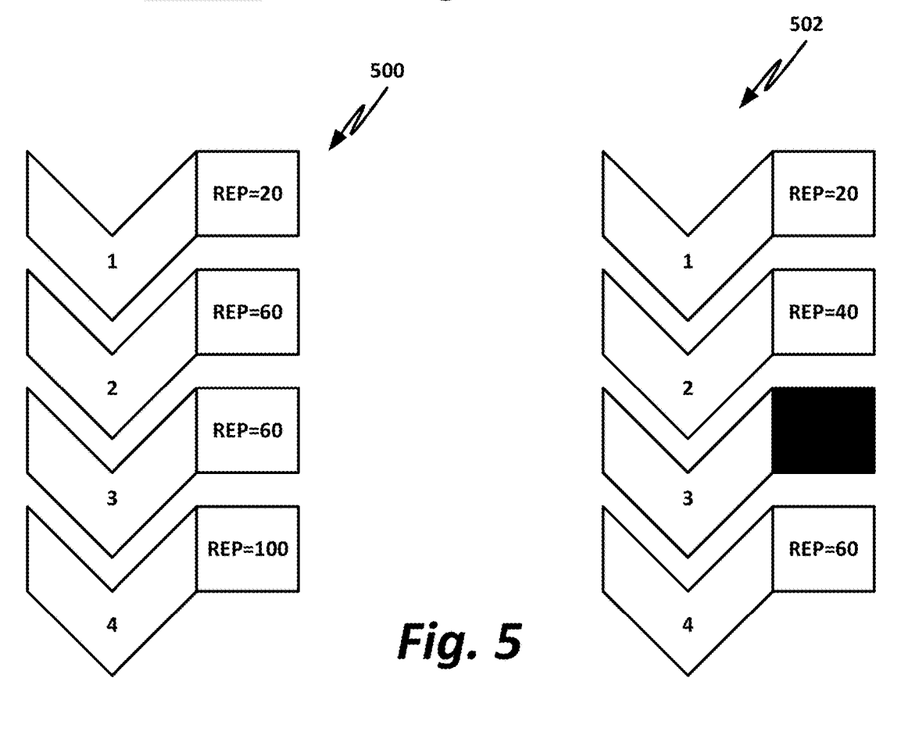
FIG. 5 is a block diagram illustration of backup versioning according to one or more examples of the present specification.

FIG. 5 is a block diagram of backup versioning according to one or more examples of the present specification. This example discloses backup chains 500 and 502 that illustrate certain aspects of the present specification.

In the example of backup chain 500, version 1 is the initial version in which a full backup is performed. Because this is an initial full backup, it may receive a default reputation, such as 20. No changes are embodied in this backup by definition. Note that in this embodiment, the reputation is a scalar value that varies directly with the "goodness" of the backup. Other embodiments are possible.

Version 2 may include minor changes, resulting in a relatively small overall delta for the backup version. Note that the delta may be with respect to individual files (file level delta) or to the backup as a whole (filesystem level delta). This version may receive a reputation of 60.

Again in version 3, minor changes are made and the backup version receives a reputation of 60.

In version 4, certain files are deleted. This triggers a high reputation of 100 because major changes have been made, resulting in a relatively large delta. Also, the deletion of certain files may be a special trigger that causes a longer-term preservation of the last or best version of that file. Version 4 is less likely to be deleted, and in some cases, to preserve a backup of the deleted file, this version is flagged for not being deleted at all or non-toll a threshold time has passed.

Note that the versioning between versions 1, 2, 3, and 4 may be file level versions, or may be file system level versions.

Backup chain 502 illustrates an example where a potential ransomware attack occurs.

In version 1, as before, an initial backup is made with no changes. This version is assigned a default reputation of 20.

In version 2, minor changes are made, resulting in a small delta. This version receives a reputation of 40.

Version 3 again includes minor changes, resulting in a small delta, and initially receives a reputation of 60.

However, in version 4, major changes are made. In this case, the number and/or type of changes exceed a delta threshold that indicates a potential malware attack. Thus, this version receives a middling reputation of 60. However, version 3 may now retroactively be assigned a much higher reputation, such as 100, indicating that version 3 may be a last good version before the malware attack occurred.

Thus, if a user tries to access a file in version 4 and discovers that ransomware has encrypted the data in that version, then version 3 (which has a very high reputation) may be flagged as a likely candidate for the last good version of those files. The user can then retrieve version 3, inspect the files, and upon determining that the files are the desired good files, restore the files from version 3. This has the advantage of not only preserving a good copy of the state of the files just before the ransomware attack occurred, but also of helping the user to easily identify that last good copy and restore it.

Figure 6:
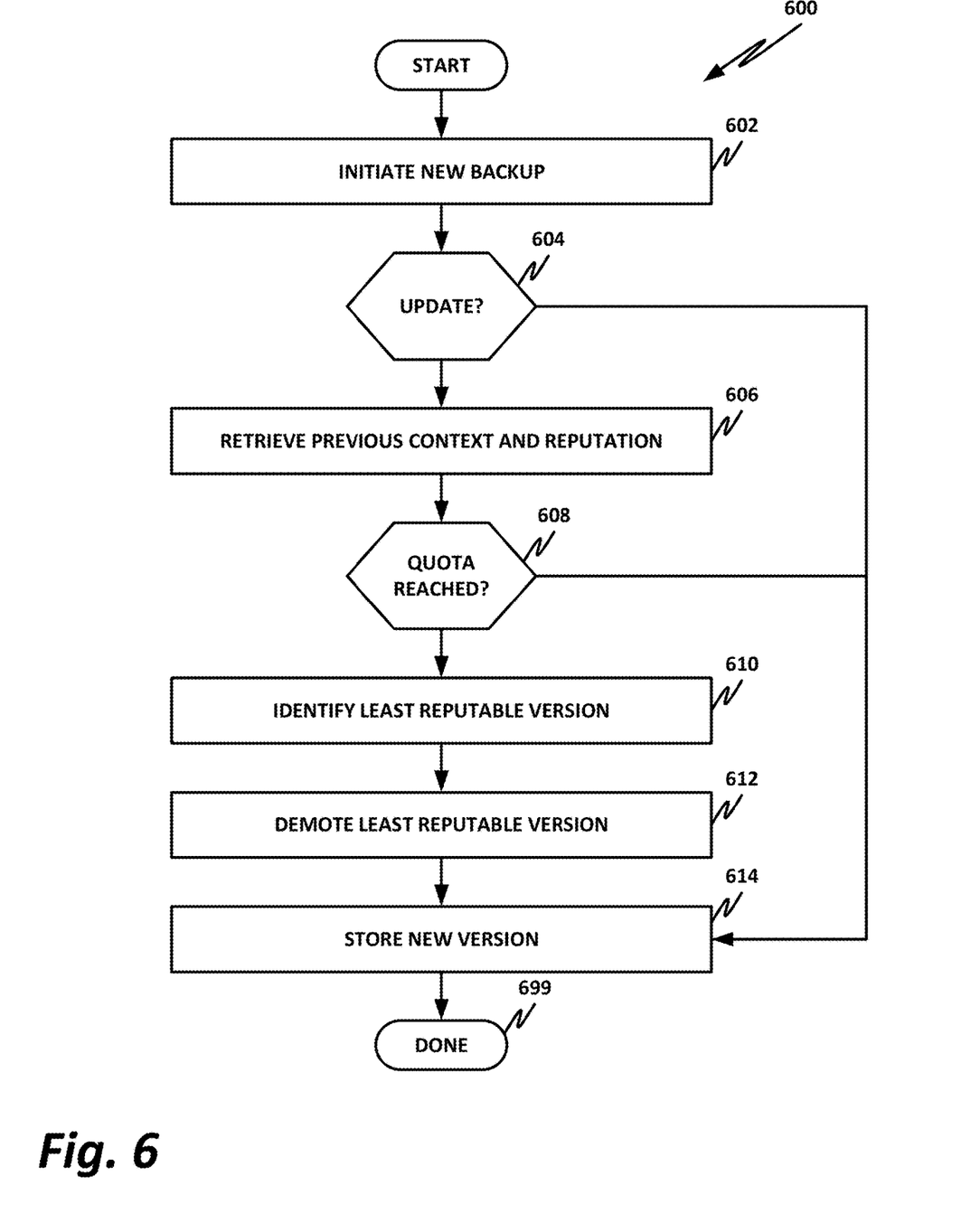
FIG. 6 is a flow chart of a method of intelligent backup according to one or more examples of the present specification.

FIG. 6 is a flowchart of a method 600 according to one or more examples of the present specification. Method 600 may be performed in certain embodiments by one or both of backup agent 224 of FIG. 2, backup server 324 of FIG. 3, or any other hardware or software configuration that provides an intelligent backup engine.

For ease of reference, the operations of method 600 are said herein to be performed by an intelligent backup engine. This intelligent backup engine should be broadly understood to include any hardware and/or software elements that are configured or operable to perform the disclose operations. Note that in certain embodiments, some of the operations disclosed herein may be distributed such as between a client and a server, or between different components on the same device, without affecting the integrity of the method.

In block 602, the intelligent backup agent initiates a new backup.

In decision block 604, the intelligent backup agent determines whether this is a new backup. For example, a new backup may be one in which data have not been backed up before, so that an initial copy needs to be made including a full backup of all data from the source. In other examples, changes may be substantial enough that it is desirable to initiate a new backup, or it may be desirable to store a full version of the backup from time to time.

If the initiated backup is not an update, then in block 614 the intelligent backup agent stores the backup, and in block 699, the method is done.

Returning to block 604, if this is an update of a previously stored backup, then in block 606, the reputation engine retrieves the previously stored context and reputation for the prior version of the backup. The prior context and reputation may help to inform the current context and reputation. For example, the previous context and reputation may negatively affect the current context and reputation if they have changed substantially. Note that in some cases, the current context and reputation may also influence the previous context and reputation, such as where the current backup is considered suspicious, and the previous backup is promoted to ensure that it is retained longer.

In decision block 608, the intelligent backup engine determines whether the quota has been reached. Note that the quota may be associated with a user of the backup service, a device, a backup source, a backup object, or any other identifiable network object for which he quota may be assigned. If the quota has not been reached, then in block 614 the current version is stored, and in block 699 the method is done.

Returning to block 608, if the quota has been reached, then the intelligent backup engine may need to identify a backup version that is a good candidate for being demoted as described herein. Note that in some embodiments, the process of identifying a best candidate for demotion may be performed off-line such as during periods of low demand. In other embodiments, the decision may be made at the time the quota is reached. In this example, in block 610, the intelligent backup engine identifies the least reputable available version of the backup object. Note that in certain embodiments, the current backup version may be expressly excluded from being tagged as the least reputable version. This may be to avoid losing the most recent backup. In other embodiments, the current backup version may be considered a potential candidate for least reputable status.

In block 612, the intelligent backup engine demotes the least reputable backup version to free up room for the current backup version. Note that in some embodiments, it may be necessary to remove multiple backup versions to make room for the current backup version. This is because not all backup versions are the same size (e.g., a smaller delta may have fewer overall data than a larger delta). In that case, the intelligent backup engine may identify a plurality of least reputable backup versions and demote those to make room for the current backup version.

In block 614, the intelligent backup engine stores the new backup version to the backup target.

In block 699, the method is done.

Figure 7:
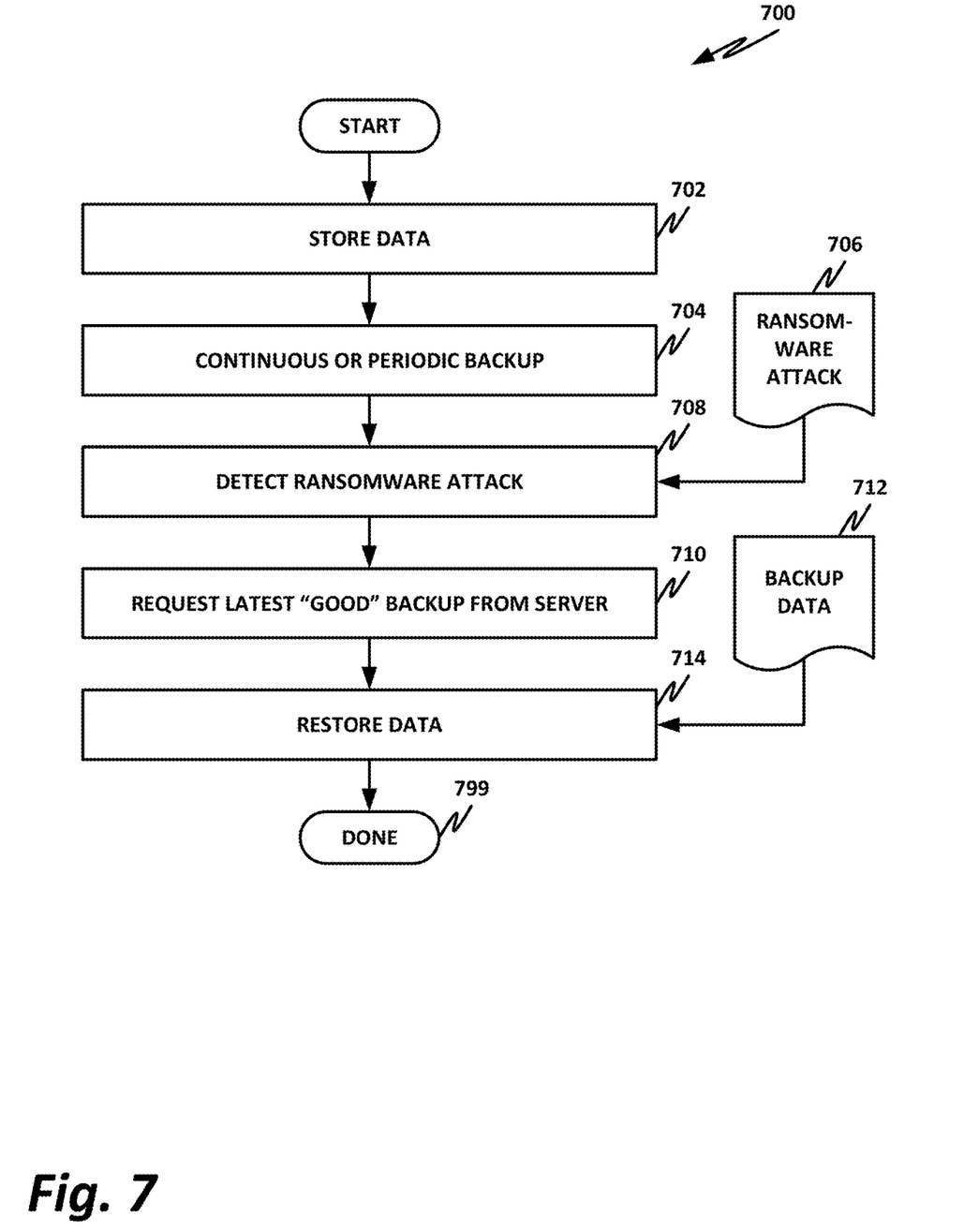
FIG. 7 is a flow chart of a method of restoring a source according to one or more examples of the present specification.

FIG. 7 is a flowchart of a method 700 according to one or more examples of the present specification. As with the example of method 600 of FIG. 6, by way of concrete illustrative example, the operations of method 700 are said to be performed by an intelligent backup engine. As before, the intelligent backup engine should be broadly construed and understood to encompass any suitable hardware and/or software configuration that may constitute an intelligent backup engine.

In block 702, the user operates a computer and stores data on its storage, constituting a backup source.

In block 704, the intelligent backup engine performs continuous or periodic backups. This could include backing up a file every time a change in that file is committed to the disk, or it could include regular nightly or other periodic backups that include all changes that have been made since the last backup. Depending on the context, this may mean that backups are considered at the individual file level, or at the file system level, as appropriate.

By way of illustration, a ransomware attack 706 may be directed toward the device. In block 708, the ransomware attack is detected. This could include the user trying to access a file and discovering that the file has been compromised, or it could include a security agent running on the computer scanning the file system and identifying the ransomware attack according to a signature or other method.

In block 710, the user (or the computer, autonomously) requests the latest good backup from a backup server or other backup destination. Note that in some cases, especially if the user has only just discovered the ransomware attack himself, he may not know when the last good version of a file should be found. In this case, it may be beneficial for the intelligent backup engine to identify a previous backup with the highest reputation, which may represent a last good version. The user may then be directed to the last good version.

In block 714, the backup server sends the requested backup data to the user, the intelligent backup engine restores the lost data.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in application specific integrated circuits (ASICs), field programmable gate arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable ROM (EEPROM), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, RAM, ROM, FPGA, erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example a computing apparatus, comprising: a processor and a memory; a network interface to communicatively couple to a backup client; a storage to receive backup data from the client, including a plurality of versions and an associated reputation for each version, the associated reputation to indicate a probability that the version is valid; and instructions encoded within the memory to instruct the processor to: receive from the backup client a request to store a new version of the backup data; determine that the client has exceeded a backup threshold; identify a backup version having a lowest reputation for validity; and expunge the backup version having the lowest reputation for validity.

There is further disclosed an example computing apparatus, wherein the instructions are further to store the new version of the backup data with an associated reputation.

There is further disclosed an example computing apparatus, wherein the instructions are further to compute a reputation for the new version of the backup data.

There is further disclosed an example computing apparatus, wherein computing the reputation for the new version of the backup data comprises computing a delta between the new version and a previous version.

There is further disclosed an example computing apparatus, wherein the previous version is an immediate previous version.

There is further disclosed an example computing apparatus, wherein a magnitude of the delta is inversely proportional to the reputation.

There is further disclosed an example computing apparatus, wherein computing the reputation includes the use of contextual data.

There is further disclosed an example computing apparatus, wherein the contextual data include a data source.

There is further disclosed an example computing apparatus, wherein the contextual data include a reputation of software that initiated change to the data.

There is further disclosed an example computing apparatus, wherein the contextual data include entropy compared to a reference entity for a document or object type in the backup.

There is further disclosed an example computing apparatus, wherein the contextual data include a writing pattern of the data.

There is further disclosed an example computing apparatus, wherein the instructions are further to provide a machine learning model to compute the reputation.

There is also disclosed an example of one or more tangible, non-transitory computer-readable storage media having stored thereon executable instructions to instruct a processor to: allocate backup data from a client device to a backup store; associate with a plurality of backup versions in the backup store individual reputation scores, the individual reputation scores representing a reputation for validity for the backup versions; associate with the client a quota for backups; receive a new incoming backup from the client device; receive from the client a new backup version; determine that new backup version exceeds the client's quota for backups; identify within the backup store a backup version having a lowest reputation score; drop the backup version having the lowest reputation score; and add the new incoming backup version to the backup store.

There is further disclosed an example of one or more tangible, non-transitory computer-readable media, wherein the instructions are further to compute a reputation for the new version of the backup data, wherein the reputation comprises contextual data.

There is further disclosed an example of one or more tangible, non-transitory computer-readable media, wherein computing the reputation for the new version of the backup data comprises computing a delta between the new version and a previous version.

There is further disclosed an example of one or more tangible, non-transitory computer-readable media, wherein the previous version is an immediate previous version.

There is further disclosed an example of one or more tangible, non-transitory computer-readable media, wherein a magnitude of the delta is inversely proportional to the reputation.

There is also disclosed an example computer-implemented method for remediating ransomware attacks on incremental backups, comprising: receiving a plurality of backup versions from a client device; associating with the backup versions individual reputations for validity; receiving a new incremental backup version that exceeds a backup quota for the client device; identifying from among the plurality of backup versions a backup version with a lowest reputation for validity; removing the backup version with the lowest reputation for validity; storing the new incremental backup version; computing for the new incremental backup version a new reputation for validity; and associating the new reputation for validity with the new incremental backup version.

There is further disclosed an example method, wherein computing the new reputation for validity comprises computing a delta with an immediate previous version, and assigning a reputation that varies inversely with the delta.

There is further disclosed an example method, wherein computing the new reputation for validity comprises accounting for contextual data about the new incremental backup.

What is claimed is:

1. A computing apparatus, comprising:
    a processor and a memory;
    a network interface to communicatively couple to a backup client;
    a storage to receive backup data from the client, including a plurality of versions and an associated reputation for each version, the associated reputation to indicate a probability that the version is valid; and
    instructions encoded within the memory to instruct the processor to:
        receive from the backup client a request to store a new version of the backup data;
        determine that the client has exceeded a backup threshold;
        identify a backup version having a lowest reputation for validity; and
    expunge the backup version having the lowest reputation for validity.

2. The computing apparatus of claim 1, wherein the instructions are further to store the new version of the backup data with an associated reputation.

3. The computing apparatus of claim 1, wherein the instructions are further to compute a reputation for the new version of the backup data.

4. The computing apparatus of claim 3, wherein computing the reputation for the new version of the backup data comprises computing a delta between the new version and a previous version.

5. The computing apparatus of claim 4, wherein the previous version is an immediate previous version.

6. The computing apparatus of claim 4, wherein a magnitude of the delta is inversely proportional to the reputation.

7. The computing apparatus of claim 3, wherein computing the reputation includes the use of contextual data.

8. The computing apparatus of claim 7, wherein the contextual data include a data source.

9. The computing apparatus of claim 7, wherein the contextual data include a reputation of software that initiated change to the data.

10. The computing apparatus of claim 7, wherein the contextual data include entropy compared to a reference entity for a document or object type in the backup.

11. The computing apparatus of claim 7, wherein the contextual data include a writing pattern of the data.

12. The computing apparatus of claim 3, wherein the instructions are further to provide a machine learning model to compute the reputation.

13. One or more tangible, non-transitory computer-readable storage media having stored thereon executable instructions to instruct a processor to:
    allocate backup data from a client device to a backup store;
    associate with a plurality of backup versions in the backup store individual reputation scores, the individual reputation scores representing a reputation for validity for the backup versions;
    associate with the client a quota for backups;
    receive a new incoming backup from the client device;
    receive from the client a new backup version;
    determine that new backup version exceeds the client's quota for backups;
    identify within the backup store a backup version having a lowest reputation score;
    drop the backup version having the lowest reputation score; and
    add the new incoming backup version to the backup store.

14. The one or more tangible, non-transitory computer-readable media of claim 13, wherein the instructions are further to compute a reputation for the new version of the backup data, wherein the reputation comprises contextual data.

15. The one or more tangible, non-transitory computer-readable media of claim 14, wherein computing the reputation for the new version of the backup data comprises computing a delta between the new version and a previous version.

16. The one or more tangible, non-transitory computer-readable media of claim 15, wherein the previous version is an immediate previous version.

17. The one or more tangible, non-transitory computer-readable media of claim 14, wherein a magnitude of the delta is inversely proportional to the reputation.

18. A computer-implemented method for remediating ransomware attacks on incremental backups, comprising:
    receiving a plurality of backup versions from a client device;
    associating with the backup versions individual reputations for validity;
    receiving a new incremental backup version that exceeds a backup quota for the client device;
    identifying from among the plurality of backup versions a backup version with a lowest reputation for validity;
    removing the backup version with the lowest reputation for validity;
    storing the new incremental backup version;
    computing for the new incremental backup version a new reputation for validity; and
    associating the new reputation for validity with the new incremental backup version.

19. The method of claim 18, wherein computing the new reputation for validity comprises computing a delta with an immediate previous version, and assigning a reputation that varies inversely with the delta.

20. The method of claim 18, wherein computing the new reputation for validity comprises accounting for contextual data about the new incremental backup.

* * * * *